(12) United States Patent
Roberts et al.

(10) Patent No.: US 9,810,092 B2
(45) Date of Patent: Nov. 7, 2017

(54) ROTOR ARRANGEMENT FOR OVER TIP LEAKAGE MEASUREMENT USING A MULTI-HOLE PRESSURE PROBE

(71) Applicant: ROLLS-ROYCE PLC, London (GB)

(72) Inventors: James Peter Roberts, Derby (GB); David Fillingham, Derby (GB)

(73) Assignee: ROLLS-ROYCE plc, London (GB)

( * ) Notice: Subject to any disclaimer, the term of this patent is extended or adjusted under 35 U.S.C. 154(b) by 18 days.

(21) Appl. No.: 14/953,188

(22) Filed: Nov. 27, 2015

(65) Prior Publication Data

US 2016/0177777 A1   Jun. 23, 2016

(30) Foreign Application Priority Data

Dec. 19, 2014   (GB) .................................. 1422716.9

(51) Int. Cl.
   *G01M 15/14*   (2006.01)
   *F01D 21/00*   (2006.01)
   *G01B 21/16*   (2006.01)
   *F01D 11/02*   (2006.01)

(52) U.S. Cl.
   CPC ............ *F01D 21/003* (2013.01); *F01D 11/02* (2013.01); *G01B 21/16* (2013.01)

(58) Field of Classification Search
   USPC ....................................................... 73/112.01
   See application file for complete search history.

(56) References Cited

U.S. PATENT DOCUMENTS

| | | | | |
|---|---|---|---|---|
| 3,754,433 A | | 8/1973 | Hyer | |
| 4,765,742 A | * | 8/1988 | Davinson | G01B 11/14 250/227.28 |
| 4,813,273 A | * | 3/1989 | Parsons | G01B 7/14 73/112.01 |
| 4,971,517 A | * | 11/1990 | Perkey | G01B 13/12 415/14 |
| 5,140,494 A | * | 8/1992 | Slade | G01B 7/14 324/660 |
| 5,203,673 A | * | 4/1993 | Evans | F01D 11/22 415/10 |

(Continued)

FOREIGN PATENT DOCUMENTS

| | | |
|---|---|---|
| EP | 2048507 A2 | 4/2009 |
| EP | 2604806 A2 | 6/2013 |

(Continued)

OTHER PUBLICATIONS

May 17, 2016 Search Report issued in European Patent Application No. 15196729.

(Continued)

*Primary Examiner* — Eric S McCall
(74) *Attorney, Agent, or Firm* — Oliff PLC (57) ABSTRACT

A rotor arrangement including: a rotor stage having an annular array of rotor blades each blade having a tip; a casing that surrounds the rotor stage and defines a clearance between the tips and the casing; and an over tip leakage measurement system including a multi-hole total pressure probe mounted to a stationary component downstream of the rotor stage; the probe arranged such that the axis of at least one of the holes is substantially aligned with an expected flow direction from the rotor stage.

19 Claims, 7 Drawing Sheets

(56) References Cited

U.S. PATENT DOCUMENTS

| | | | |
|---|---|---|---|
| 6,575,011 B1 * | 6/2003 | Busby | G01N 3/56 |
| | | | 73/7 |
| 7,215,129 B1 * | 5/2007 | Andarawis | F01D 21/003 |
| | | | 324/661 |
| 2005/0274178 A1 | 12/2005 | Shin | |
| 2005/0286995 A1 | 12/2005 | Shang et al. | |
| 2006/0239813 A1 * | 10/2006 | Shah | F01D 11/08 |
| | | | 415/119 |
| 2006/0291059 A1 * | 12/2006 | Heyworth | G01B 11/14 |
| | | | 359/570 |
| 2012/0069355 A1 * | 3/2012 | Hynous | G01B 11/026 |
| | | | 356/625 |
| 2013/0111982 A1 * | 5/2013 | Batzinger | G01M 15/14 |
| | | | 73/112.01 |
| 2014/0064924 A1 * | 3/2014 | Warren | G01B 7/14 |
| | | | 415/118 |
| 2014/0321985 A1 * | 10/2014 | Lewis | F01D 11/20 |
| | | | 415/139 |
| 2015/0323301 A1 * | 11/2015 | Zhe | G01B 7/14 |
| | | | 324/207.15 |

FOREIGN PATENT DOCUMENTS

| | | |
|---|---|---|
| GB | 2042646 A | 9/1980 |
| GB | 2063374 A | 6/1981 |
| GB | 2374123 A | 10/2002 |
| JP | S58-20904 A | 2/1983 |

OTHER PUBLICATIONS

Mar. 30, 2015 Search Report issued in British Patent Application No. 1422716.9.

* cited by examiner

Fig.5
Exit flow angle dependence on tip clearance

ROTOR ARRANGEMENT FOR OVER TIP LEAKAGE MEASUREMENT USING A MULTI-HOLE PRESSURE PROBE

BACKGROUND

The present invention relates to over tip leakage measurement and to tip clearance measurement. In particular it relates to over tip leakage measurement and to tip clearance measurement for a rotor arrangement, for example in a gas turbine engine.

In a rotor arrangement there is a hub with an annular array of blades around its periphery. Each blade has a tip at its radially outer extremity. The rotor is surrounded by a casing which is close to, but not abutting, the blade tips so that there is a small clearance defined between the casing and blade tips. It is advantageous to minimise the clearance, to improve efficiency of the rotor arrangement, whilst ensuring that some clearance remains so that there is no rubbing between the blade tips and casing. It is a necessary precursor to controlling the clearance to be able to accurately measure the tip clearance.

Figure 1:
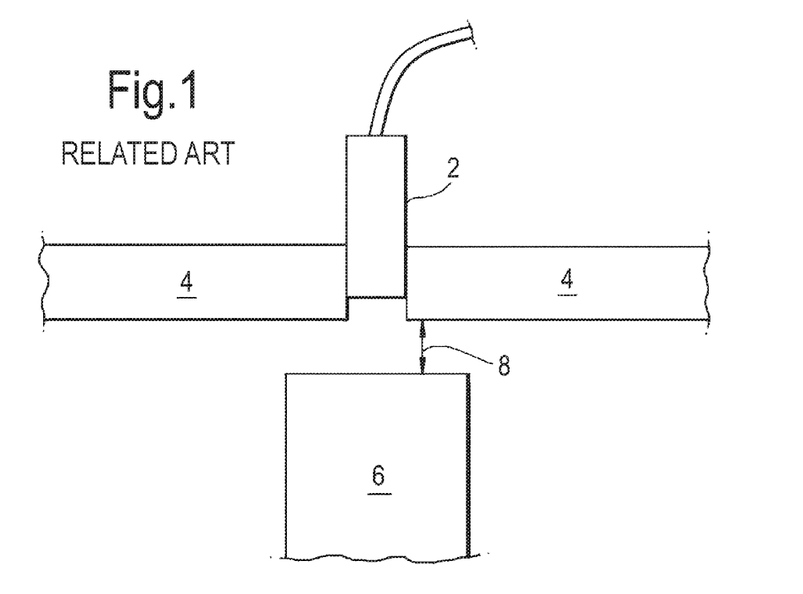
FIG. 1 is a schematic sectional view of a known arrangement.

In a known arrangement, shown in FIG. 1, a proximity probe 2 is mounted through the casing 4. It is axially aligned with the tip of the rotor blade 6 to measure the clearance 8. The proximity probe 2 may be mounted to be recessed from the line of the casing 4 to prevent contact between the tips of the rotor blades 6 and the probe 2. Known probes 2 use capacitance, optics, microwave or eddy currents in order to determine the distance between the probe 2 and the tip of the rotor blade 6, and thus the clearance 8.

One disadvantage of the known arrangement is that mounting the probe 2 through the casing 4 reduces the mechanical strength of the casing 4 at this position. This may prevent the casing 4 from being suitable to contain a released rotor blade. A further disadvantage is that the thermal behaviour of the casing 4 in the vicinity of the proximity probe 2 is changed by the presence of the probe 2 which may cause the casing to distort out of circular during operation.

Another disadvantage of the known arrangement arises where the tips of the rotor blades 6 include features such as shrouds or other protrusions and recesses. In this situation any axial movement of the rotor blades 6, for example caused by thermal expansion of components in the axial direction, results in a different part of the tip being directly underneath the probe 2. Thus the distance measured by the probe 2, and thus the clearance 8 determined, will not necessarily be the tightest clearance 8 resulting from the radial position of the blade 6 relative to the casing 4.

A further disadvantage of the known arrangement is that the proximity probes 2 are complex and delicate. Therefore they are ill-suited to the harsh temperatures in which rotor arrangements, particularly those in gas turbine engines, often operate. The probes 2 of the known arrangement are thus unreliable.

A yet further disadvantage of the known arrangement is that the derivation of the clearance 8 is dependent on the previously measured or determined relative position of the probe 2 relative to the radially inner surface of the casing 4. This position can change, for example due to casing erosion, which results in an error in the derived clearance 8.

SUMMARY

The present invention provides a rotor arrangement including an over tip leakage measurement system that seeks to address the aforementioned problems.

Accordingly the present invention provides a rotor arrangement comprising:
a rotor stage having an annular array of rotor blades, each blade having a tip;
a casing that surrounds the rotor stage and defines a clearance between the tips of the rotor blades and the casing; and
an over tip leakage measurement system comprising a multi-hole pressure probe mounted to a stationary component axially spaced from (downstream of) the rotor stage; the probe arranged such that an axis of symmetry of the probe is substantially aligned with an expected flow direction from the rotor stage and the holes are symmetrical about the axis of symmetry of the probe.

Advantageously the tip clearance measurement is more accurate than known methods because the flow direction is affected by the over tip leakage rather than a direct measurement which may not be aligned with any change in tip clearance. The measurement is also unaffected by axial movement or twist of the rotor blades for the same reason. Advantageously the pressure probe is able to function in a hotter environment than known proximity probes. Therefore the arrangement is suitable for measuring the tip clearance of a turbine stage of a gas turbine engine, as well as other rotor arrangements.

The multi-hole pressure probe may comprise at least two holes. The multi-hole pressure probe may comprise three holes. The multi-hole pressure probe may comprise five holes. It is beneficial for the pressure probe to comprise an odd number of holes so that there is a central hole. The central hole may be used to measure stagnation pressure.

The holes may be arranged in a row such that each of the side holes forms an angle of up to 60° with the central hole. Advantageously the pressure recovered through each side hole is different when the flow exiting the rotor stage is not in the expected flow direction, aligned with the axis of symmetry of the probe. Advantageously this difference may be used to determine the flow angle at the probe and therefore the over tip leakage through the tip clearance.

The side holes may be further from the rotor stage than the central hole. The holes may be arranged on a frustoconical surface such that the central hole is located on the truncation in place of the apex of the cone and the side holes are located on the angled surfaces of the cone.

The holes may lie in a radial plane that is parallel to the rotor stage. The holes may be circumferentially or tangentially spaced. The holes may be radially spaced. Some of the holes may form a circumferential or tangential array whilst some of the holes may form a radial array. Where the probe comprises five holes they may be arranged in a cruciform formation so that the central hole and two side holes form a circumferential or tangential array and the central hole and two other side holes form a radial array. Advantageously the distance, direction and angle of spacing may be optimised for the expected variation in flow direction caused by changes of the over tip leakage and effective tip clearance between the rotor blade tips and the casing.

The probe may be a temperature and pressure sensor. Advantageously only one sensor is required to obtain measurement of two variables. This is smaller and lighter than providing separate sensors.

The stationary component to which the probe is mounted may be the casing. Advantageously the probe can be easily aligned with the fluid flow that exits the rotor stage over and near to the tip of the rotor blades. The stationary component to which the probe is mounted may be a static vane.

Advantageously the probe does not protrude into the flow path and therefore does not have an effect on the downstream flow pattern.

The rotor arrangement may further comprise a tip clearance control arrangement. The tip clearance control arrangement may be coupled to the over tip leakage measurement system to receive a measurement of the tip clearance. The control arrangement may be arranged to actuate the casing to increase or decrease the tip clearance relative to the measured tip clearance. The control arrangement may be arranged to actuate a component that is mounted radially inwards of the casing, such as a segment, to increase or decrease the tip clearance relative to the measured tip clearance. Alternatively the control arrangement may be arranged to adjust sealing and/or cooling air flows to change the effective tip clearance. Advantageously this provides a feedback loop to more tightly control the over tip leakage. Advantageously this reduces the excess fuel burnt by an engine in which the rotor arrangement is located. Advantageously it is not necessary to directly measure the tip clearance in order to control the over tip leakage.

The rotor stage may comprise a compressor; a turbine; a fan; an impeller; or centrifugal turbomachinery such as a turbocharger.

A gas turbine engine may comprise the rotor arrangement as described. Advantageously the rotor arrangement may comprise any rotor stage in a gas turbine engine, including a compressor, a turbine, a fan, or a shaft.

The gas turbine engine may further comprise a stationary vane located rearwards of the rotor stage. The probe may be mounted to the stationary vane. Advantageously the probe does not protrude into the flow path and therefore does not have an effect on the downstream flow pattern.

A water jet impeller may comprise the rotor arrangement as described. Advantageously the pressure probe is effective for measuring water pressure instead of air pressure or the pressure of another gas.

A tip clearance arrangement for use in the rotor arrangement as described. The tip clearance arrangement comprises the probe suitable to be mounted downstream of, axially spaced from, a rotor stage to receive flow from the rotor stage. The tip clearance arrangement may also comprise a processor to process the pressure measurements to obtain the flow angle and thence the over tip leakage and tip clearance. The tip clearance arrangement may further comprise a tip clearance control arrangement as described.

The present invention also provides a method of measuring over tip leakage between rotor blade tips and a surrounding casing of a rotor stage, the method comprising steps to:
provide a multi-hole pressure probe axially spaced from (downstream of) the rotor stage and arranged such that an axis of symmetry of the probe is substantially aligned with an expected flow direction from the rotor stage and the holes are symmetrical about the axis of symmetry of the probe;
measure the pressure at each hole of the probe;
compare the measured pressures to the expected pressures and outputting a pressure difference for each hole; and
derive the flow direction of fluid exiting the rotor stage from the pressure and/or pressure differences; the flow direction being determined relative to an axial direction.

Advantageously the method provides a robust over tip leakage measurement. Advantageously the method determines deviation of the flow direction from the expected direction due to over tip leakage.

The expected flow direction may be substantially axially from the rotor stage.

The method may further comprise a step to derive tip clearance as a function of the flow direction.

The flow direction and/or the tip clearance may be derived experimentally. The flow direction and/or the tip clearance may be derived analytically. The flow direction and/or the tip clearance may be inversely proportional to the flow direction.

The step to derive the flow direction may comprise optical flow measurement. The step to derive the flow direction may comprise laser anemometry. The step to derive the flow direction may comprise ultrasonic flow measurement. The step to derive the flow direction may comprise particle image velocimetry.

A processor may be adapted to perform steps of the method as described. The processor may be coupled to an engine electronic controller. The processor may be a function of an engine electronic controller. The processor may be located close to or remote from the pressure probe.

Any combination of the optional features is encompassed within the scope of the invention except where mutually exclusive.

BRIEF DESCRIPTION OF THE DRAWINGS

The present invention will be more fully described by way of example with reference to the accompanying drawings, in which.

DETAILED DESCRIPTION

Figure 2:
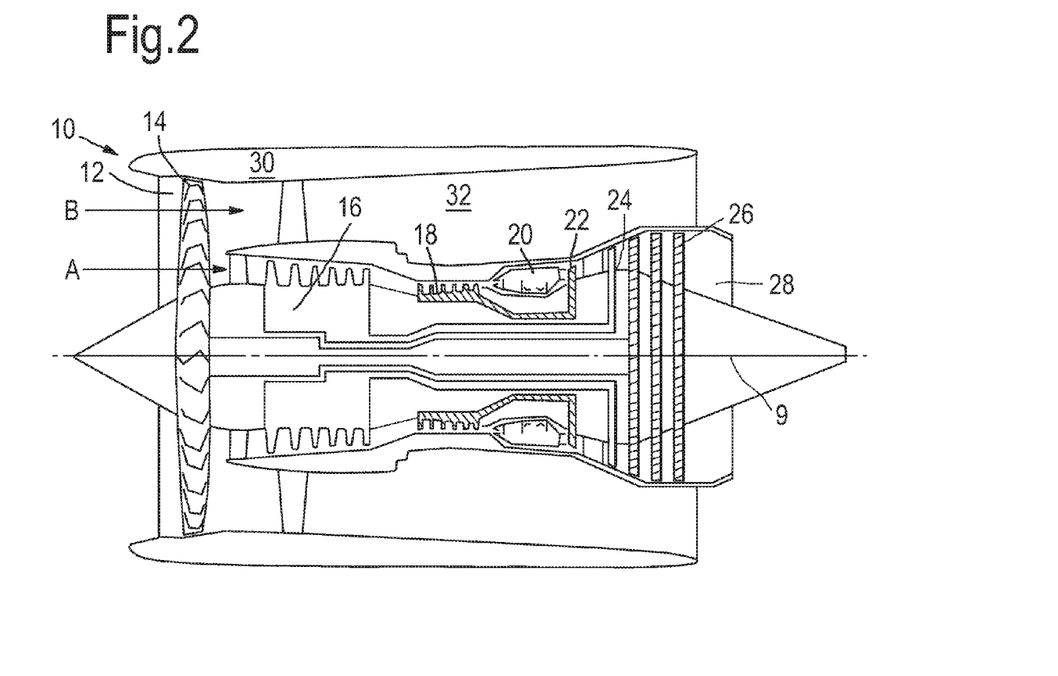
FIG. 2 is a sectional side view of a gas turbine engine.

The rotor arrangement of the present invention will first be described in terms of a gas turbine engine 10. A gas turbine engine 10 is shown in FIG. 2 and comprises an air intake 12 and a propulsive fan 14 that generates two airflows A and B. The gas turbine engine 10 comprises, in axial flow A, an intermediate pressure compressor 16, a high pressure compressor 18, a combustor 20, a high pressure turbine 22, an intermediate pressure turbine 24, a low pressure turbine 26 and an exhaust nozzle 28. A nacelle 30 surrounds the gas turbine engine 10 and defines, in axial flow B, a bypass duct 32. The gas turbine engine 10 is generally axisymmetric about a rotational axis 9.

In use, air is drawn into the air intake 12 and is accelerated by the fan 14. It is split into the two axial flows A, B. In a high bypass ratio gas turbine engine, the majority of the air is passed through the bypass duct 32 to be expelled to give propulsive thrust. The remainder of the air is passed into the core engine (axial flow A) where it is compressed and accelerated by the intermediate pressure compressor 16 and then the high pressure compressor 18. Fuel is injected into the combustor 20 and combusted with the air from the high pressure compressor 18. Hot combustion gases are expelled from the combustor 20. The gases are expanded and slowed through the high pressure turbine 22, intermediate pressure turbine 24 and finally through the low pressure turbine 26 before being expelled through the exhaust nozzle 28 to provide a small amount of the propulsive thrust.

Figure 3:
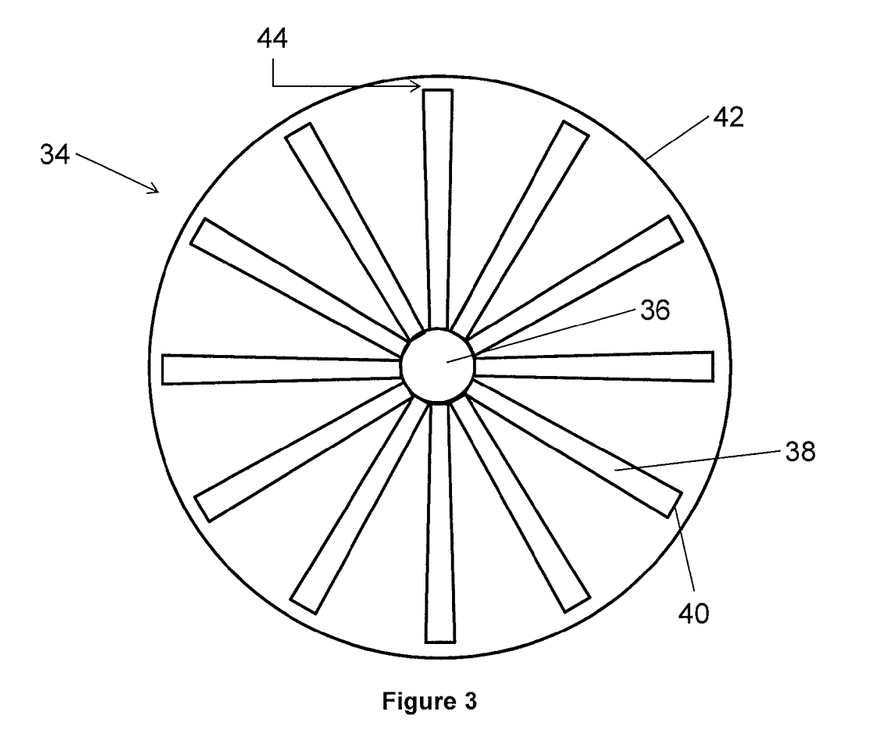
FIG. 3 is a schematic illustration of a rotor stage of a gas turbine engine.

Each of the fan 14, intermediate pressure compressor 16, high pressure compressor 18, high pressure turbine 22, intermediate pressure turbine 24 and low pressure turbine 26 comprises one or more rotor stages. A schematic illustration of a rotor stage 34 is shown in FIG. 3 comprising a rotor hub 36 from which radiate a plurality of blades 38. The blades 38 each comprise a blade tip 40 at the radially distal end from the hub 36. The blade tips 40 may comprise shrouds which abut to form a continuous ring. Radially outside the blade tips 40 is a rotor stage casing 42 which may include a segment assembly comprising a plurality of segments forming its radially inner surface as will be understood by those skilled in the art. Between the blade tips 40 and the rotor stage casing 42 is a clearance 44. The clearance 44 may be aerodynamically reduced relative to its physical size by applying blocking flow, for example from the rotor stage casing 42 or segments, to the clearance 44. Similarly, the clearance 44 may be aerodynamically increased by sucking air from the clearance 44, for example into the rotor stage casing 42 or segments.

In use of the gas turbine engine 10, working fluid (air) does work on the rotor blades 38 as it passes substantially axially through the engine 10. Working fluid that passes over the blade tips 40 through the clearance 44 does no useful work and therefore reduces the efficiency of the engine 10 and increases fuel consumption. However, the clearance 44 is necessary to prevent the blade tips 40 rubbing against the rotor stage casing 42 which causes damage to one or both components. Tip rub is a transient effect because the rub erodes the blade tip 40 or casing surface which results in the clearance 44 being increased and therefore the engine efficiency reducing.

Additionally the clearance 44 is not constant throughout use of the gas turbine engine 10. Taking the example of a gas turbine engine 10 used to power an aircraft, the rotor stage 34 components grow and shrink in response to centrifugal forces and temperature changes resulting from different engine operating conditions. There may also be relative axial movement of the rotor stage 34 components.

Figure 4:
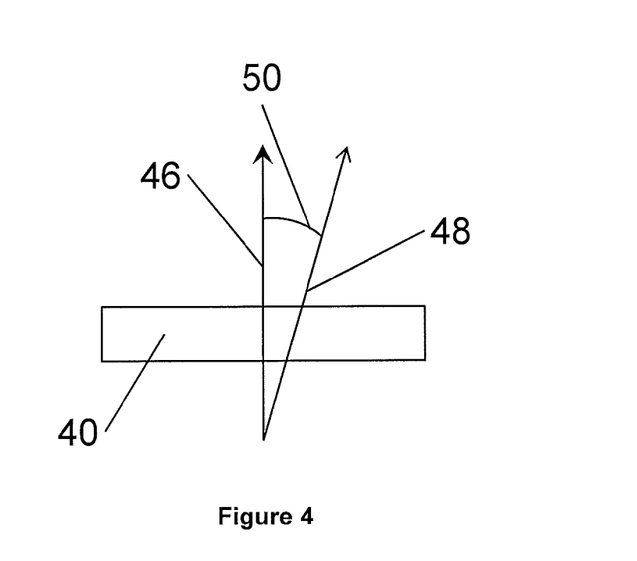
FIG. 4 is a schematic plan view of flow over a blade tip.

It has been ascertained that the clearance 44 has a direct and predictable effect on the flow direction of fluid exiting the rotor stage 34. FIG. 4 is a plan view of a blade tip 40. The fluid exiting the rotor stage 34 flows, for example, substantially axially as shown by arrow 46. However, the flow direction 48 may include a tangential or circumferential component due to the clearance 44 between the blade tips 40 and the rotor stage casing 42. Flow angle 50 may be defined as the angle made between the direction 48 along which the fluid flows and the null direction 46.

Figure 5:
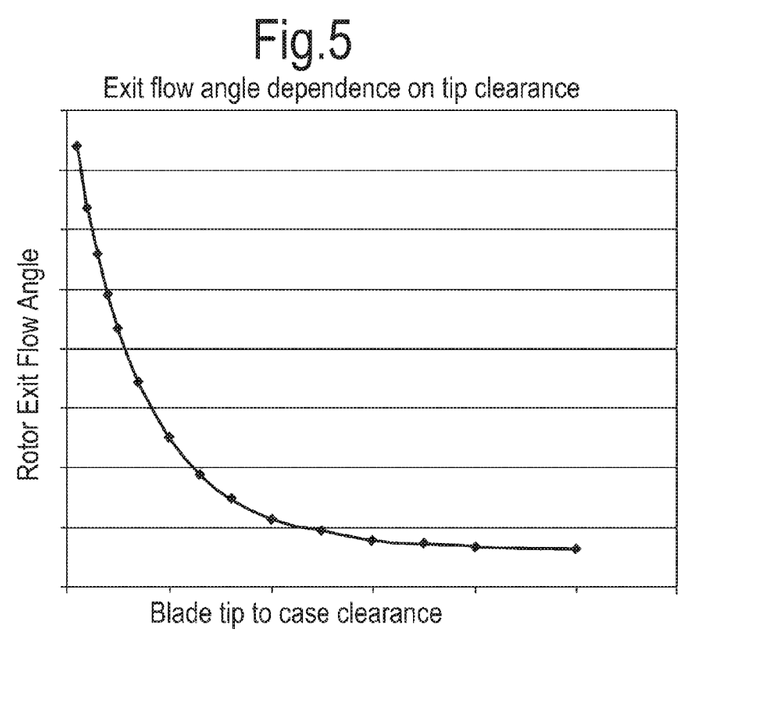
FIG. 5 is a graph of flow angle against clearance.

The relationship between the clearance 44 and the angle 50 of the flow exiting the rotor stage 34 can be seen in FIG. 5. Thus the larger the clearance 44 between the blade tips 40 and the rotor stage casing 34 and thus the larger the over tip leakage, the smaller the flow angle 50. Hence the flow angle 50 is dependent on the over tip leakage, and thus the clearance 44, in a predictable relationship. The relationship may be determined for a particular application experimentally or by computational fluid dynamics or any other method. The relationship may be proportional or inversely proportional; it may be linear or non-linear. The relationship may be dependent on the specific application, examples of which are described throughout this description.

Figure 6:
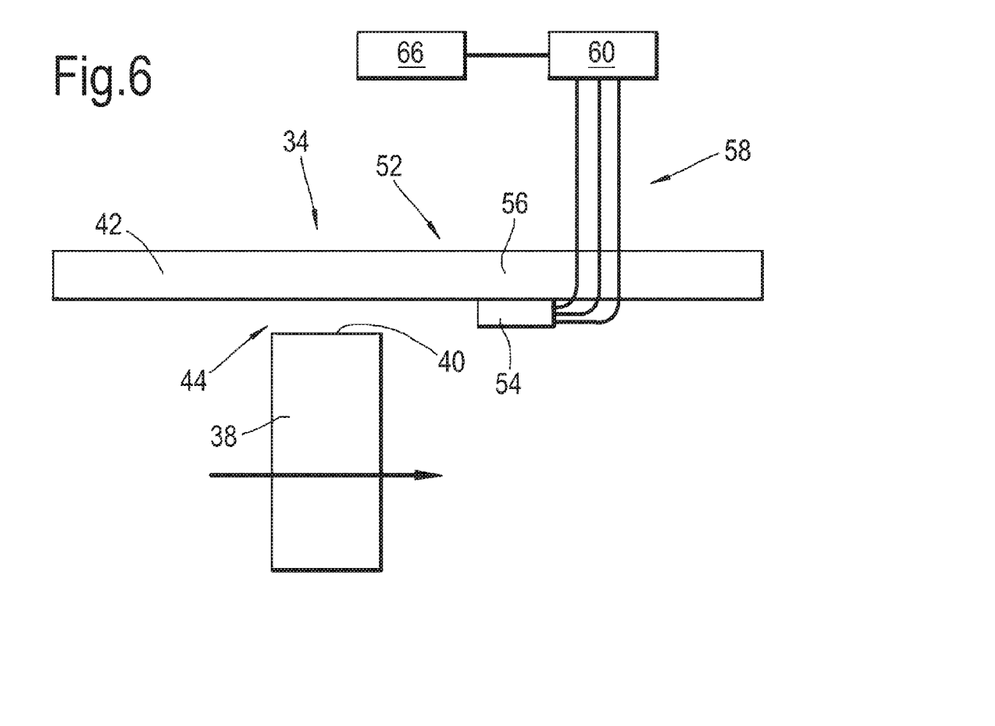
FIG. 6 is a schematic sectional view of a rotor arrangement according to the present invention.

Thus the rotor arrangement includes an over tip leakage measurement system 52, as shown in FIG. 6. The over tip leakage measurement system 52 is located downstream of the rotor stage 34, where downstream is relative to the flow through the gas turbine engine 10 shown by the arrow across the blade 38. The over tip leakage measurement system 52 includes a multi-hole pressure probe 54 which is further described with respect to FIG. 7 and FIG. 8.

The probe 54 is mounted to a stationary component 56 located downstream of the rotor stage 34. In the illustrated example the stationary component 56 is part of the rotor stage casing 42 which extends axially rearwards of the rotor blades 38. The probe 54 may be mounted to the stationary component 56 or may be integrally formed in the component 56. Coupled to the probe 54 is a plurality of signal pipes, wires or leads 58 which transmit the probe measurements to a processor 60.

Figure 7:
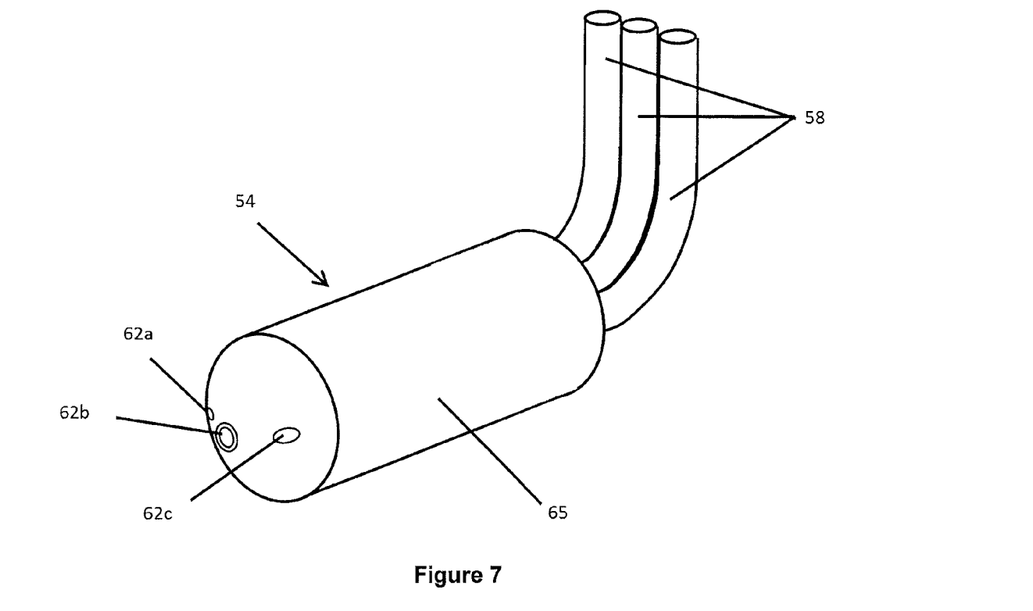
FIG. 7 is a perspective view of a probe used in accordance with the present invention.
Figure 8:
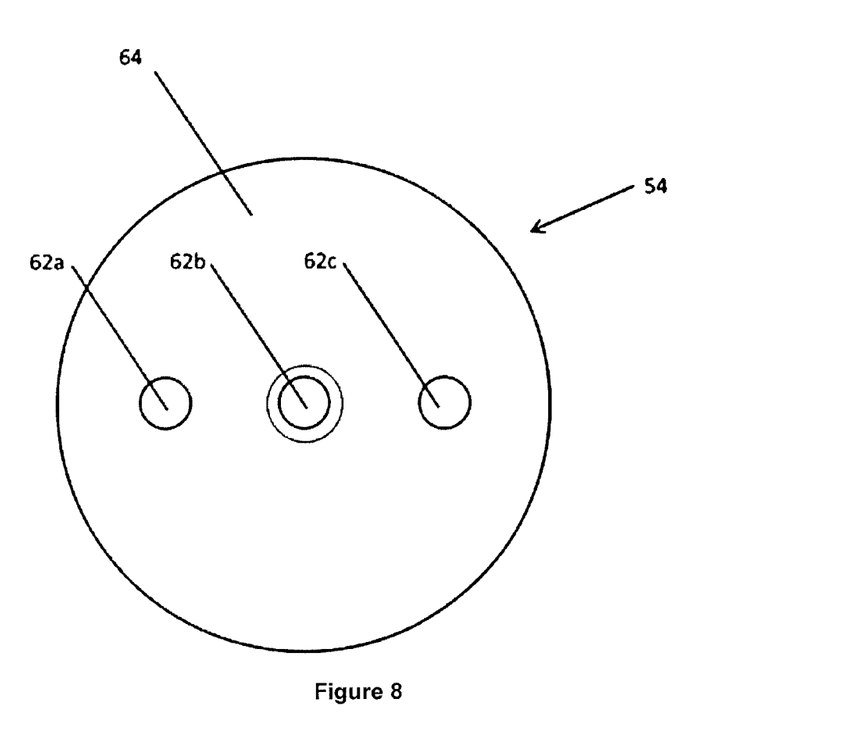
FIG. 8 is a front view of a probe used in accordance with the present invention.

An exemplary probe 54 is described with respect to FIG. 7 and FIG. 8. The probe 54 is a multi-hole probe for measuring pressure. The probe 54 is generally cylindrical and may be a solid body or hollow. As illustrated there are three holes 62a, 62b, 62c (collectively 62) which are arranged in a straight line. Each hole 62 comprises an aperture in the front surface 64 of the probe 54 and is coupled to a tube through the body 65 of the probe 54. The tubes of the holes 62 are hollow cylinders and extend parallel to each other, from the front surface 64 at one end to the other end of the cylindrical probe body 65.

The front surface 64 of the probe 54 is frustoconical, with the central hole 62b substantially filling the flat portion at the nose of the cone. The side holes 62a, 62c are formed in the sloping parts of the front surface 64 and are each equally spaced from the central hole 62b. The periphery of each side hole 62a, 62c is elliptical because it is formed by the intersection of a cylindrical tube with the angled part of the front surface 64. At the opposite end to the holes 62 in the front surface 64 of the probe 54 each tube is coupled to a pipe, wire or lead 58.

The probe 54 is positioned so that the symmetrical axis of the body 65, and therefore the axis of the central hole 62b, is aligned with the expected direction of fluid flow. A small amount of flow is thus received through each hole 62 into its tube inside the body 65 of the probe 54 and is stagnated as it enters the tube. A pressure tapping into each tube measures the pressure in that tube. The pressure recovered by each tube is lower than the pressure of the fluid flow. The amount by which it is lower is related to the angle between the mean flow direction and a vector perpendicular to the tapping. The pressure measurement at the end of each tube is passed to the processor 60 via the pipes 58. Alternatively the pressure measurement may be converted to an electrical representation, by transducers located close to the tip of the probe 54, and passed to the processor 60 via wires or leads 58.

The side holes 62a, 62c are angled in opposite directions, due to the shape of the front surface 64 of the probe 54. For example a line perpendicular to the plane of each side hole 62a, 62c may make an angle of up to 60° with a line perpendicular to the plane of the central hole 62b. The angle subtended between the side holes 62a, 62c may therefore be up to 120°. This means that when the fluid flow is away from the expected flow direction the pressure recovered by one of the side holes 62a, 62c is increased whereas the pressure recovered by the other of the side holes 62a, 62c is decreased. The amount by which the recovered pressure changes may be the same for each side hole 62a, 62c or may be different for one side hole 62a relative to the other side hole 62c.

As is shown in FIG. 6, the probe 54 is positioned downstream of the rotor stage 34 and at approximately the same radial position as the clearance 44 between the blade tips 40 and the casing 42. The probe 54 is aligned so that the symmetrical axis of its body 65 is aligned with the expected flow direction of fluid that exits the rotor stage 34. The probe 54 is orientated so that the holes 62 form a line that is parallel to the tangent to the casing 42 at the position to which it is mounted. Alternatively the holes 62 may be arranged to form an arc that is parallel to the arc of the casing 42 so that the holes 62 form a portion of a circumferential array. The holes 62 may be close enough together that there is little discernable difference between a tangential and a circumferential array.

When the over tip leakage is off-design, that is larger or smaller than optimal, the flow direction changes from the expected flow direction. In this case the pressure measurement recorded in the tube coupled to each hole 62 is different. Thus one of the side holes 62a will sample a higher pressure than when the fluid flow is in the expected direction, the central hole 62b will remain stagnated and recover most or all of the pressure, and the other side hole 62c will sample a lower pressure than when the fluid flow is in the expected direction. The flow angle can be determined from the difference in pressure sampled at each of the side holes 62a, 62c compared to the pressure recovered through the central hole 62b.

Figure 9:
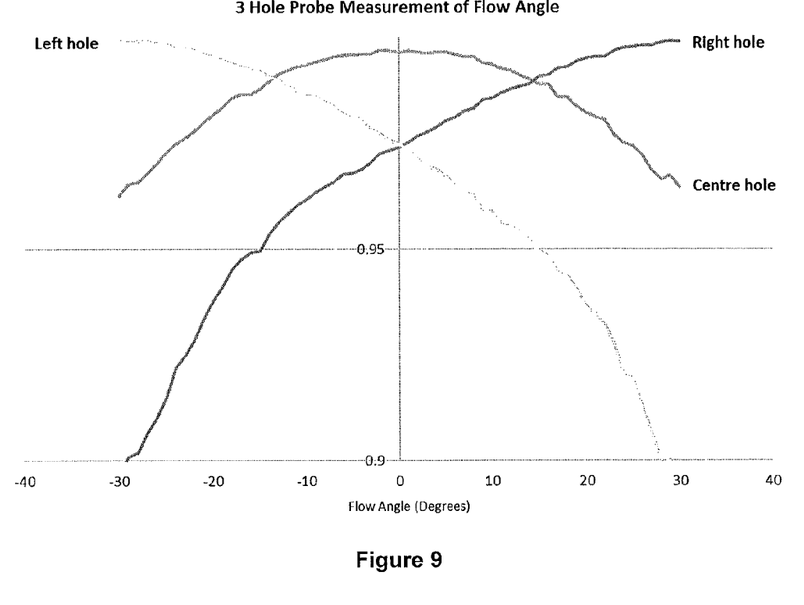
FIG. 9 is a graph of pressure measurement against flow angle used in accordance with the present invention.

By modelling or calibration of flow angle against pressure measurements in each of the tubes of the three holes 62 a look-up table, graph or algorithm can be generated. The look-up table, graph or algorithm relates the flow angle to the set of pressure measurements. An exemplary plot of how the measured pressure of flow through each hole 62 varies with flow angle is shown in FIG. 9. As is apparent there is a regular, predictable pattern to the pressure measurement given a known input flow angle.

Thus in the processor 60 the pressure measurements from each of the holes 62 of the probe 54 can be used to read off the flow angle from the look-up table or graph, or to calculate the flow angle from the algorithm. Then the processor 60 can use the derived flow angle to determine the over tip leakage and/or the tip clearance 44 via another look-up table, graph or algorithm. A typical relationship between flow angle and tip clearance 44 is shown in FIG. 5. Alternatively the processor 60 may comprise a look-up table, graph or algorithm that combines the determination of flow angle with the determination of over tip leakage and/or tip clearance 44. Such a table, graph or algorithm requires the pressure measurements as inputs and directly outputs the over tip leakage and/or tip clearance 44 without the intermediate output of flow angle.

Optionally the over tip leakage measurement system 52, particularly the processor 60, is coupled to a tip clearance control arrangement 66. The tip clearance control arrangement 66 is arranged to actuate the casing 42, or a seal segment radially inwards of the casing 42, to increase or decrease the clearance 44 and therefore control the over tip leakage. The control arrangement 66 actuates in response to a comparison of the determined flow angle 50 and the expected flow angle 46, or to a comparison of the determined clearance 44 and the desired optimum clearance 44. Thus if the flow angle 50 or clearance 44 determined from the pressure measurements taken in the probe 54 is greater than the expected flow angle 46 or desired optimum clearance 44 respectively the control arrangement 66 will actuate the casing 42 to move it radially inwards and thus reduce the clearance 44 and hence over tip leakage. Conversely if the flow angle 50 or clearance 44 determined from the pressure measurements taken in the probe 54 is smaller than the expected flow angle or desired optimum clearance 44 respectively the control arrangement 66 will actuate the casing 42 to move it radially outwards and thus increase the clearance 44 and hence over tip leakage. Preferably the tip clearance control arrangement 66 operates closed loop control. That is it receives regular (or continuous) values of the determined over tip leakage or clearance 44 from the processor 60, calculates the required change in over tip leakage and/or clearance 44 and actuates the casing 42 accordingly in an iterative manner.

A particular multi-hole pressure probe 54 has been described. However, other variants are within the scope of the claimed invention. For example, there may be only two holes 62, which are arranged to be symmetrical about the axis of symmetry of the probe 54, which itself if aligned with the expected flow direction. Thus the pressure measured via each of the holes 62 changes with flow angle 50 in the same manner as the side holes 62a, 62c.

Alternatively there may be more than three holes 62. The tube of the central hole 62b is aligned with the expected flow direction. Two or more side holes 62a, 62c are provided as angled inlets. For example four or five holes 62 may be provided. Beneficially providing more holes 62 enables three-dimensional flow direction to be determined and therefore changes in flow angle in more than one plane to be detected. This may provide greater sensitivity to changes in over tip leakage and tip clearance 44 to be detected.

Although the holes 62 have been described in a tangential or circumferential array on the front surface 64 of the probe 54, other arrangements are feasible. For example the holes 62 may form a radial array. Thus the holes 62 are in a line across the front surface 64 of the probe 54, as previously described, but the probe 54 is orientated so that the side holes 62a, 62c are radially inside and radially outside of the central hole 62b. This arrangement is beneficial where the change in flow direction caused by the change of over tip leakage and/or tip clearance 44 is in a direction other than the circumferential or tangential directions, particularly in the radial direction.

More complex arrangements of holes 62 on the front surface 64 of the probe 54 are also feasible. Such arrangements may be beneficial where the change in flow direction caused by the change of over tip leakage and/or tip clearance 44 has components in both the radial direction and the circumferential or tangential directions, or in other compound directions.

The body 65 of the probe 54 has been described as cylindrical. However, it may take any other form suitable to house the tubes extending between the holes 62 and the pipes, wires or leads 58 connected to the processor 60. For example the body 65 may be a prism having a polygonal cross-section such as a cuboid, triangular prism, pentagonal prism, hexagonal prism or be based on a polygon having more sides. Such polygons may be regular or irregular.

The body 65 of the probe 54 may be omitted. Instead the probe 54 may comprise the tubes directly joined together. Thus the probe 54 may resemble a honeycomb-like structure of tubes. Some of the adjacent tubes may have common walls.

Figure 10:
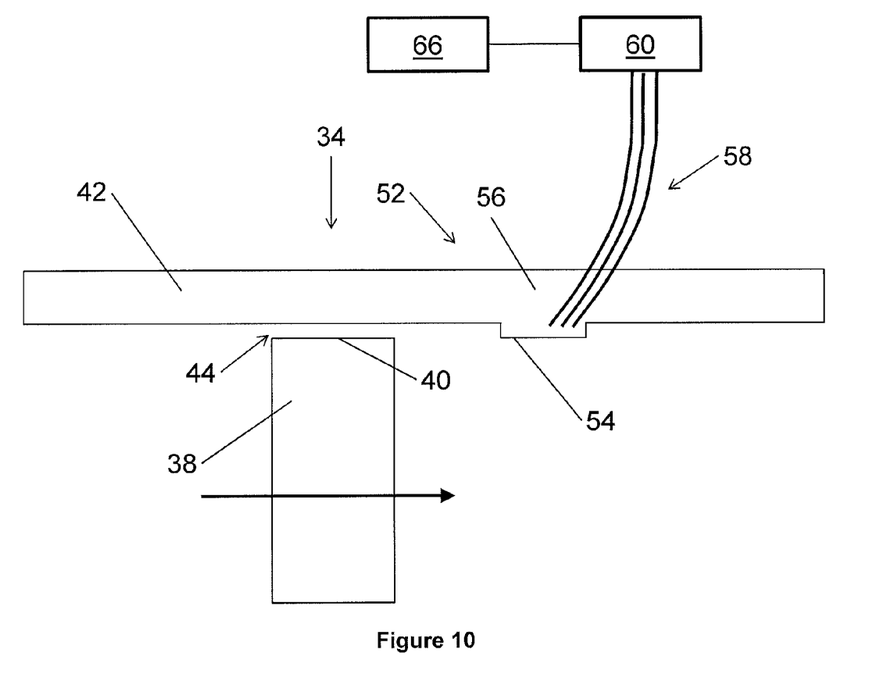
FIG. 10 is a schematic sectional view of a rotor arrangement according to the present invention.

The body 65 of the probe 54 may be an integral part of the stationary component 56. Thus the tubes of the holes 62 may comprise bores through the stationary component 56, such as the downstream portion of the casing 42, to open as apertures formed in the surface of the stationary component 56. In this case the probe 54 is not a separate component but is formed as part of the stationary component 56. The stationary component 56 may, therefore, be configured or adapted to have a portion that protrudes radially inwards so that the holes 62 can be directed to the efflux from the clearance 44 and the bores be aligned with the expected flow direction from the clearance 44. FIG. 10 shows a schematic example of such an arrangement.

Figure 11:
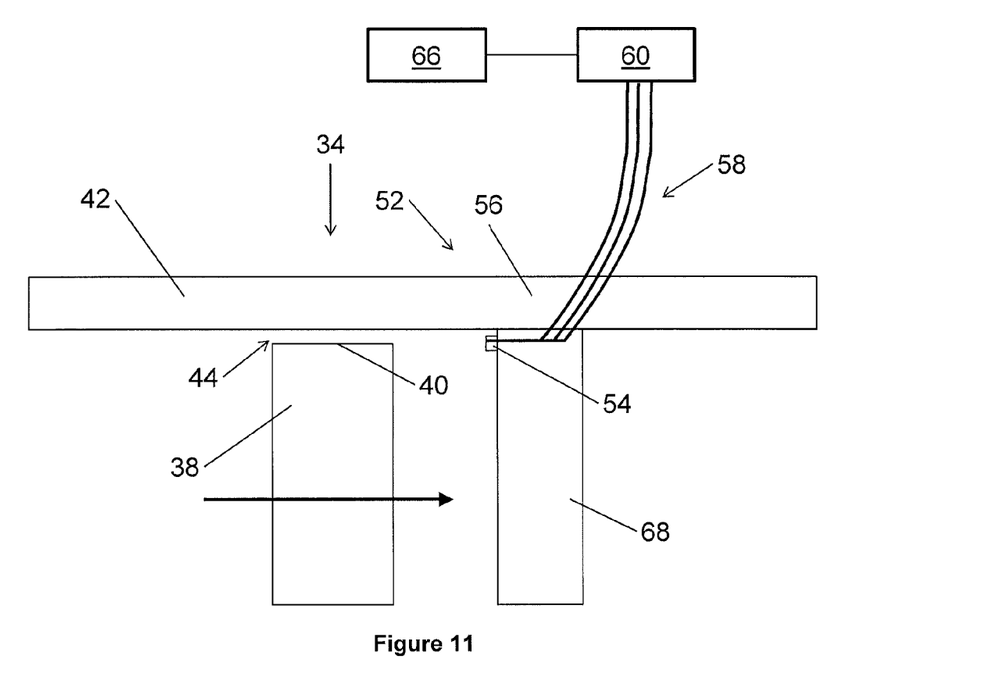
FIG. 11 is a schematic sectional view of a rotor arrangement according to the present invention.
Figure 12:
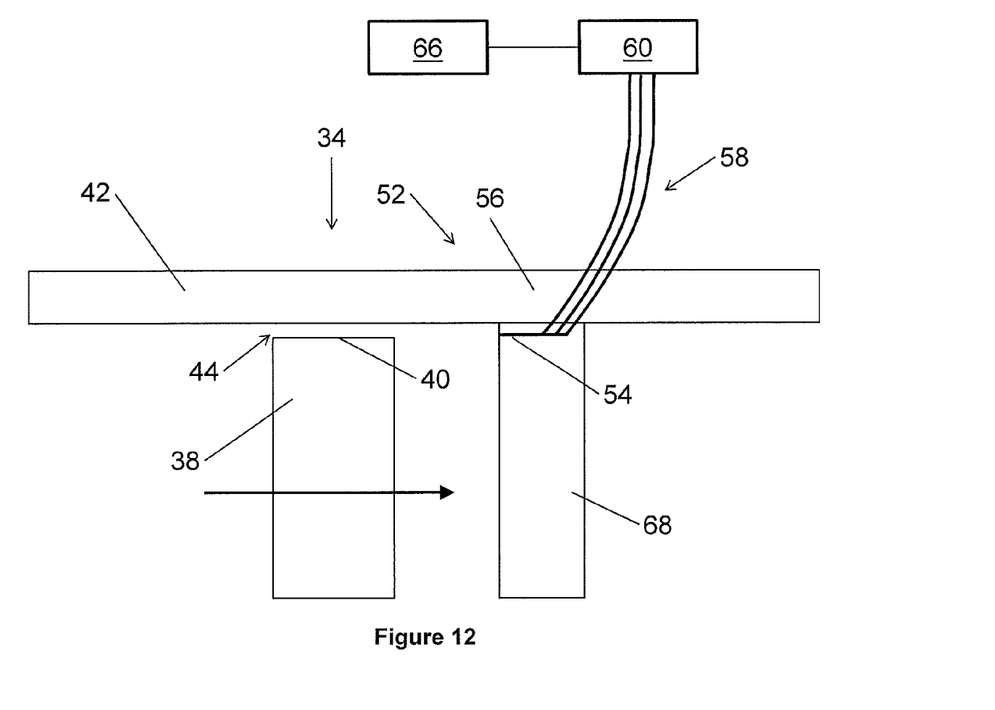
FIG. 12 is a schematic sectional view of a rotor arrangement according to the present invention.

The stationary component 56 may be a vane 68 as shown in FIG. 11 and FIG. 12. The vane 68 may be one of a plurality of vanes forming an annular array downstream, rearwards, of the rotor stage 34. The probe 54 may be mounted to the vane 68, as shown in FIG. 11, or may comprise holes 62 opening as apertures in the front surface of the vane 68 and coupled with bores through the vane 68, as shown in FIG. 12.

Although the front surface 64 of the probe 54 has been described as frustoconical, where the probe 54 is separate to the stationary component 56 to which it is mounted, other arrangements are feasible. For example, the front surface 64 may be convex so that each of the holes 62 is on a curved surface.

Alternatively the front surface 64 may be flat. In this case it may be advantageous to angle the tubes of the holes 62 so that they are not parallel with each other. In this way the holes 62 will each receive different flow when the flow efflux from the clearance 44 is not in the expected direction because the over tip leakage and/or clearance 44 is non-optimal. The tubes may be straight and therefore extend at the same angle for their full length through the body 65 of the probe 54. Alternatively the tubes may be curved or angled only for the portion close to the holes 62 in the front surface 64, with the other end of the tubes being parallel.

Figure 13:
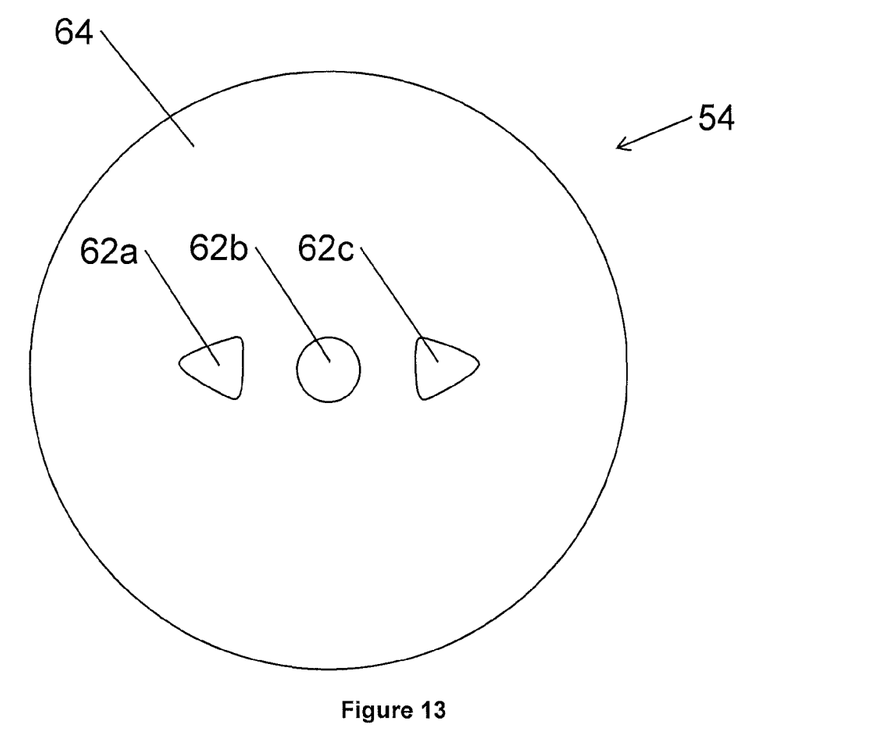
FIG. 13 is a front view of a probe used in accordance with the present invention.

Alternatively where the front surface 64 is flat each of the side holes 62a, 62c may be non-circular to preferentially receive the flow at different flow angles. For example the side holes 62a, 62c may be elliptical or may be based on a triangle with a wider section proximal to the central hole 62b and a narrower section distal to the central hole 62b. Such a probe 54 is shown in FIG. 13. Other shapes of hole 62, particularly of the side holes 62a, 62c, are also feasible.

Although the tubes have been described as extending parallel to the expected flow direction, the null direction 46, they may instead extend substantially perpendicularly to this direction. In this case pairs of the side holes 62a, 62c face in opposite direction to each other, for example on diametrically opposed surfaces of a circular, frustoconical or cylindrical probe 54. As will be apparent to the skilled reader, the angle of the pressure measurement tubes to the flow direction simply affects whether static pressure, total pressure or some combination thereof is measured.

The probe 54 may be arranged or configured to measure temperature as well as total pressure. For example the probe 54 may include a sensing head that measures pressure and temperature instead of a simple pressure tapping.

Figure 14:
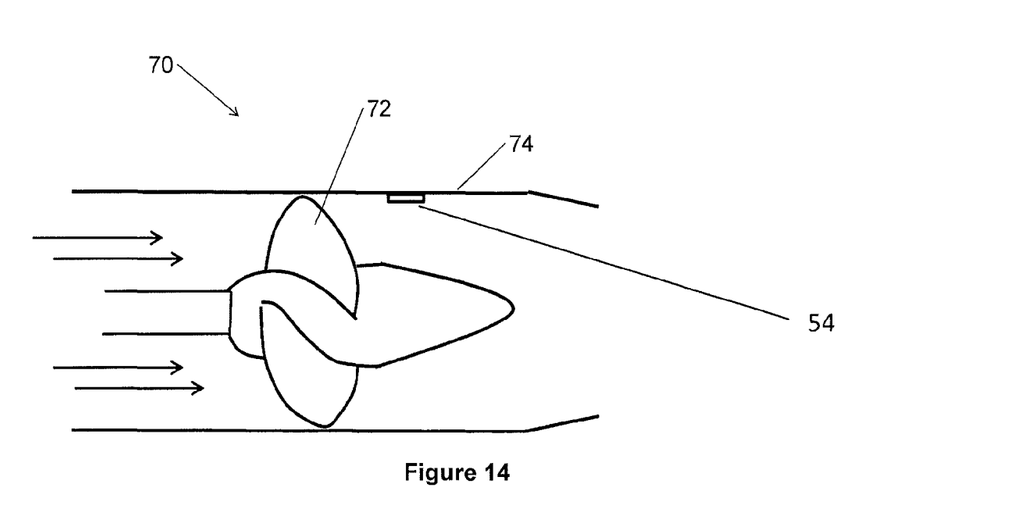
FIG. 14 is a schematic illustration of a water jet impeller.

FIG. 14 shows a water jet impeller 70 in which the over tip leakage measurement system 52 may be used. The probe 54 is located downstream of the rotor 72. There is no static vane downstream of the rotor 72 and so the probe 54 is mounted to the wall 74 forming the channel in which the rotor 72 rotates. The fluid is water, rather than air or another gas. Therefore it is important that the tubes 58 remain full of water, and that the pressure transducers are ideally located at a similar height to the probe 54, to minimise the effect of the mass of the column of water in the tubes on the pressure readings.

A method of measuring over tip leakage through the tip clearance 44 between the tips 40 of the rotor blades 38 and the rotor stage casing 42, or segments coupled radially inside the casing 42, can be performed. First a multi-hole pressure probe 54 is provided downstream of and axially spaced from the rotor stage 34. As has been described the probe 54 is mounted to a stationary component 56 or is integrally formed in the stationary component 56. The holes 62 of the probe 54 are arranged to be radially aligned with the clearance 44 and to form a circumferential, tangential, radial or more complex array.

Second the pressure of flow received at each hole 62 is measured. Third the measured pressures are compared to the expected pressures, where the expected pressures are based on the optimal over tip leakage and/or clearance 44 and thus the expected flow direction of the efflux from the clearance 44 of the rotor stage 34. A pressure difference between the measured and expected pressure from each hole 62 is the output of the comparison. The comparison may be performed by a processor 60.

Fourth the flow direction of the fluid exiting the rotor stage 34 is derived from the pressure differences. This step may be performed by a processor 60, either the same as performed the comparison and outputted the pressure difference or another processor coupled thereto. The fourth step may comprise using one or more look-up tables or graphs. Alternatively it may comprise applying one or more algorithms. The flow direction may be determined relative to an axial direction of the rotor stage 34 that is parallel to its rotational axis.

In an optional further step the over tip leakage and/or tip clearance 44 is derived as a function of the flow direction. This step may comprise using one or more look-up tables or graphs. Alternatively it may comprise applying one or more algorithms.

The invention claimed is:

1. A rotor arrangement comprising:
   a rotor stage having an annular array of rotor blades, each blade having a tip;
   a casing surrounding the rotor stage and defining a clearance between the tips of the rotor blades and the casing; and
   an over tip leakage measurement system including a multi-hole pressure probe mounted to a stationary component axially spaced from the rotor stage, the probe arranged to substantially align an axis of symmetry of the probe with an expected flow direction from the rotor stage, the probe including a plurality of holes that are symmetrical about the axis of symmetry of the probe.

2. The rotor arrangement as claimed in claim 1, wherein the multi-hole pressure probe comprises at least three holes.

3. The rotor arrangement as claimed in claim 2, wherein the holes are arranged in a row such that side holes of the plurality of holes form an angle of up to 60° with a central hole of the plurality of holes.

4. The rotor arrangement as claimed in claim 2, wherein side holes of the plurality of holes are axially further from the rotor stage than a central hole of the plurality of holes.

5. The rotor arrangement as claimed in claim 1, wherein the holes are located in a radial plane parallel to the rotor stage and are circumferentially or tangentially spaced.

6. The rotor arrangement as claimed in claim 1, wherein the holes are located in a radial plane parallel to the rotor stage and are radially spaced.

7. The rotor arrangement as claimed in claim 1, wherein the probe is a temperature and pressure sensor.

8. The rotor arrangement as claimed in claim 1, wherein the stationary component to which the probe is mounted is the casing.

9. The rotor arrangement as claimed in claim 1, further comprising a tip clearance control arrangement, the control arrangement (i) coupled to the over tip leakage measurement system to receive a measurement indicative of an over tip leakage and/or a tip clearance, and (ii) arranged to actuate the casing to increase or decrease a tip clearance relative to the measured tip clearance.

10. The rotor arrangement as claimed in claim 1, wherein the rotor stage includes: (i) a compressor, (ii) a turbine, (iii) a fan, (iv) an impeller, or (v) centrifugal turbo-machinery.

11. A gas turbine engine comprising the rotor arrangement as claimed in claim 1.

12. The gas turbine engine as claimed in claim 11, further comprising a stationary vane located rearwards of the rotor stage, wherein the probe is mounted to the stationary vane.

13. A water jet impeller comprising the rotor arrangement as claimed in claim 1.

14. An over tip leakage measurement system for use in the rotor arrangement as claimed in claim 1.

15. A method of measuring over tip leakage between rotor blade tips and a surrounding casing of a rotor stage, the method comprising steps to:
provide a multi-hole pressure probe axially spaced from the rotor stage and arranged to substantially align an axis of symmetry of the probe with an expected flow direction from the rotor stage, the probe including a plurality of holes that are symmetrical about the axis of symmetry of the probe;
measure a pressure at each hole of the plurality of holes of the probe;
compare the measured pressures to expected pressures and output a pressure difference for each hole; and
derive a flow direction of fluid exiting the rotor stage from the pressure differences, the flow direction being determined relative to an axial direction.

16. The method as claimed in claim 15, further comprising a step to derive over tip leakage and/or tip clearance as a function of the flow direction.

17. The method as claimed in claim 16, wherein the tip clearance is inversely proportional to the flow direction.

18. The method as claimed in claim 15, wherein the step to derive the flow direction includes: (i) optical flow measurement, (ii) laser anemometry, (iii) ultrasonic flow measurement, or (iv) particle image velocimetry.

19. The method as claimed in claim 15, wherein the steps of the method are performed by a processor.

* * * * *